(12) United States Patent
Cao

(10) Patent No.: US 7,523,108 B2
(45) Date of Patent: Apr. 21, 2009

(54) METHODS AND APPARATUS FOR SEARCHING WITH AWARENESS OF GEOGRAPHY AND LANGUAGES

(75) Inventor: Yu Cao, Monterey Park, CA (US)

(73) Assignee: Platformation, Inc., Monterey Park, CA (US)

( * ) Notice: Subject to any disclaimer, the term of this patent is extended or adjusted under 35 U.S.C. 154(b) by 0 days.

(21) Appl. No.: 11/752,205

(22) Filed: May 22, 2007

(65) Prior Publication Data

US 2007/0288422 A1    Dec. 13, 2007

Related U.S. Application Data

(60) Provisional application No. 60/811,989, filed on Jun. 7, 2006.

(51) Int. Cl.
*G06F 17/30* (2006.01)
*G06F 7/00* (2006.01)

(52) U.S. Cl. .................................................. 707/5
(58) Field of Classification Search .................. None
See application file for complete search history.

(56) References Cited

U.S. PATENT DOCUMENTS

| | | | |
|---|---|---|---|
| 6,308,087 B1 * | 10/2001 | Aoshima | 340/7.28 |
| 6,623,529 B1 * | 9/2003 | Lakritz | 715/536 |
| 7,140,538 B2 * | 11/2006 | Lee | 235/379 |
| 2002/0049742 A1 * | 4/2002 | Chan et al. | 707/1 |
| 2002/0099533 A1 * | 7/2002 | Jaqua | 704/1 |
| 2002/0193986 A1 * | 12/2002 | Schirris | 704/8 |
| 2003/0081591 A1 * | 5/2003 | Cheung et al. | 370/352 |
| 2004/0194099 A1 * | 9/2004 | Lamping et al. | 718/100 |
| 2004/0205118 A1 * | 10/2004 | Yu | 709/203 |
| 2004/0254932 A1 * | 12/2004 | Gupta et al. | 707/7 |
| 2005/0114114 A1 * | 5/2005 | Rudolph | 704/10 |
| 2005/0144093 A1 * | 6/2005 | Kassan | 705/27 |
| 2005/0240392 A1 * | 10/2005 | Munro et al. | 704/8 |
| 2006/0026122 A1 * | 2/2006 | Hurwood et al. | 707/1 |
| 2006/0060646 A1 * | 3/2006 | Lee | 235/379 |
| 2006/0106778 A1 * | 5/2006 | Baldwin | 707/3 |
| 2006/0117304 A1 * | 6/2006 | Anastassopoulos et al. | 717/136 |
| 2006/0200766 A1 * | 9/2006 | Lakritz | 715/536 |
| 2007/0112777 A1 * | 5/2007 | Field et al. | 707/10 |

(Continued)

FOREIGN PATENT DOCUMENTS

WO    WO 2006133252 A2 *   12/2006

OTHER PUBLICATIONS

Bar-Ilan, J. and T. Gutman "How Do Search Engines Handle Non-English Queries?—A Case Study", Proceedings of the Twelfth International World Wide Web Conference (WWW2003), May 20-24, 2003.*

(Continued)

*Primary Examiner*—Luke S Wassum
(74) *Attorney, Agent, or Firm*—Fish & Associates, PC

(57) ABSTRACT

A system that automatically discerning the best combinations of a user query's geographical origin and language, retrieving and displaying search results accordingly. A record on the system are associated with a geographic location and a language. A record could be composed of two or more records, each of which associates with a location and a language. A record could be in rich media format.

11 Claims, 10 Drawing Sheets

U.S. PATENT DOCUMENTS

| | | | |
|---|---|---|---|
| 2007/0136086 A1* | 6/2007 | Luerssen | 705/1 |
| 2007/0150512 A1* | 6/2007 | Kong et al. | 707/104.1 |
| 2007/0266024 A1* | 11/2007 | Cao | 707/6 |
| 2007/0282813 A1* | 12/2007 | Cao et al. | 707/3 |
| 2007/0288314 A1* | 12/2007 | Cao et al. | 705/14 |
| 2008/0010259 A1* | 1/2008 | Feng et al. | 707/3 |

OTHER PUBLICATIONS

Hughes, B. and A. Kamat "A Metadata Search Engine for Digital Language Archives", D-Lib Magazine, vol. 11, No. 2, Feb. 2005.*

Hughes, B. "Towards a Web Service for Minority Language Communities", Proceedings of the Open Road 2006 Conference, Feb. 7, 2006.*

Chung, W., A. Bonillas, G. Lai, W. Xi and H. Chen "Supporting Non-English Web Searching: An Experiment on the Spanish Business and the Arabic Medical Intelligence Portals", Decision Support Systems, vol. 42, 2006, pp. 1697-1714.*

* cited by examiner

US 7,523,108 B2

METHODS AND APPARATUS FOR SEARCHING WITH AWARENESS OF GEOGRAPHY AND LANGUAGES

CROSS REFERENCE TO RELATED APPLICATIONS

This application claims priority to U.S. patent application Ser. No. 60/811,989 filed Jun. 7, 2006.

FIELD OF THE INVENTION

The field of the invention is searching technologies.

BACKGROUND

Globalization necessitates an audience of diverse languages and geographic locations. To satisfy a user's information need, relevance is necessarily a function of both language and location.

Consider a company whose potential clients are in different countries and regions, speaking difference languages. The company's web site contains pages that are relevant for different clients. For example, one page aims at potential English-speaking clients from Los Angeles ("our sales office is a short distance from the Union Station. . . ."); another page aims at potential clients from Los Angeles speaking Spanish; still another page at clients from Los Angeles speaking Chinese; and still another page at clients from Shanghai speaking Chinese (a Chinese equivalent of the following message "Our Shanghai office handles businesses throughout the Eastern China").

Now suppose all these web pages are searchable through a search engine.

A user query submitted to the search engine might originate from any part of the world, and the user composes the query in a language of her choice. If the search engine can automatically discern the origin, and the language, of the query, then the engine can match information in the most appropriate combination of location and language, and display accordingly. For example, a barber shop's information is typically relevant only to a user from the same or neighboring zip codes, a CPA from the same or neighboring cities, and a software developer maybe the same country, all preferentially speaking the same language as a potential client.

In searching, the state of the art is to use information contained in user's browser and the user query to detect the country (in prior art FIG. 4, for example), or the geographic location (in prior art FIG. 5, for example), or the preferred language (in prior art FIG. 3, for example). There is also prior art that uses information provided by user's browser to determine both the country and the language (in prior art FIG. 2, for example).

The state of the art is not satisfactory. For one reason, geographic locations are of different "granularities" arranged in a hierarchical manner. It decidedly enhances relevance if the smallest possible granularity (many times much finer than "country") is discerned, and used in searching. For example, the zip code 90024 corresponds to an area within the district of West Los Angeles, which in turn is within the city of Los Angeles, which in turn is part of the Greater Los Angeles, Southern California, California, America's West Coast, the United States of America, and North America. When the zip code 90024 is detected, search results associated with the zip code might be the most relevant, those associated with the district are less relevant, and in a decreasing order of relevance those associated with the city, the region, so on.

The state of the art is not satisfactory, for another reason, that sometimes there could be multiple detected locations. Further, sometimes there could be multiple detected languages. The state of the art uses only one pair of location and language, if that.

Further, the recent explosion of online videos for consumers, exemplified by contents on and visits to YouTube.com, leads to the contention that an explosion of online video for businesses is in the offing. Continuing the example above, suppose the company's web site features "About Us" videos that are dubbed in different languages aiming at different geographic locations. The need for a search engine to consider the best combinations of location and language is even more pronounced.

An observation from the example above is that many times a same piece of information exists in different languages for audiences in different locations, which calls for a means to identifying such relationships among records. Current state of the art does not speak to this.

The discussion above applies to records that comprise of Web pages, documents, catalogues, and advertisements.

This and all other extraneous materials discussed herein are incorporated by reference in their entirety. Where a definition or use of a term in an incorporated reference is inconsistent or contrary to the definition of that term provided herein, the definition of that term provider herein applies and the definition of that term in the reference does not apply.

What is still needed is methods that automatically discern geographic locations of the smallest possible granularity, determine the language or the languages of the user query, and evaluate the applicability of the geographic locations using at least the language or the languages. Once locations and languages are determined, best combinations of locations and language help retrieve and display records.

SUMMARY OF THE INVENTION

FIG. 1 depicts the scheme of Claim 1 of this invention, which comprises methods that automatically discern a set of suspected geographical origins from which a user may have connected to a server, identify one or more languages of a user query, use the languages to evaluate applicability of each of the suspected origins, and use the origins and languages in retrieving records and displaying them to the user.

A geographic origin is the geographic location from which the user is connected to a server in the contemplated system. A geographic location can be a zip code (or generally a postal code), an airport code, a city, a non-political region such as "West Los Angeles" or "New England", a city, a county, metropolitan or micropolitan statistical areas as defined by the US Census (e.g., "Norfolk-Virginia Beach-Newport News"), a country, or a continent. In the discerning step, a smallest possible origin is sought out. For example, if "Los Angeles" can be discerning, it is preferred to "California".

The discerning step utilizes information from user's connection, which could be via a Web browser, a cell phone, or a PDA, to name a few. The step also makes use of the user query, extracting information that is suggestive geographic locations. The result is a set of suspected origins to be further evaluated.

The use query is analyzed to find out the language, or sometimes languages, of the user query. The result is used in evaluating members of the set of suspected origins.

Once the origins and languages are determined, both help to guide retrieving of records. Records that match the origins and languages are preferred to those do not. When retrieved records contain at least two records each matching a different origin, with one embodiment, display is arranged so that records from two or more origins are concurrently displayed. Similarly, when retrieved records contain at least two records each matching a different language, with one embodiment, display is arranged so that records two or more languages are concurrently displayed.

Records are also partitioned so that different partitions are applied different functions in retrieving and displaying. For example, one partition of the records could comprise web pages from a company, and another partition could comprise advertisements in textual or rich media format from a same company.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
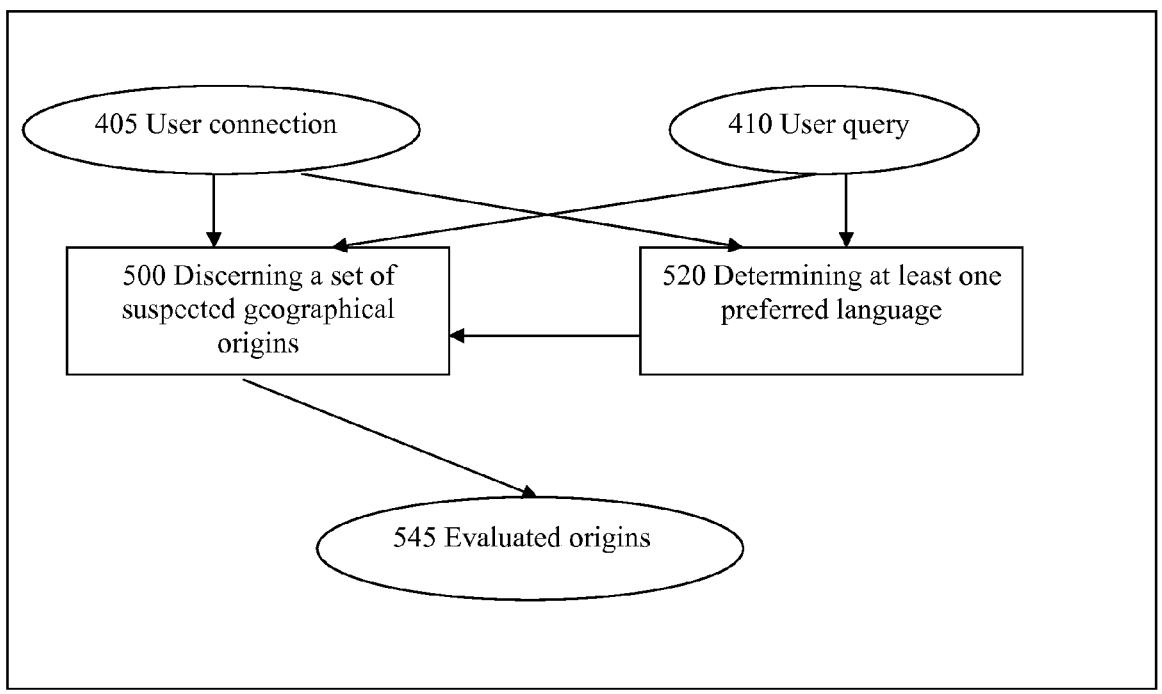
FIG. 1 depicts the scheme of Claim 1 of this invention, where a user connection and a user query are used in the following steps: (1) discerning suspected geographic origins of the user; (2) detecting user language; and (3) using the language or the languages to evaluate the suspected origins.
Figure 2:
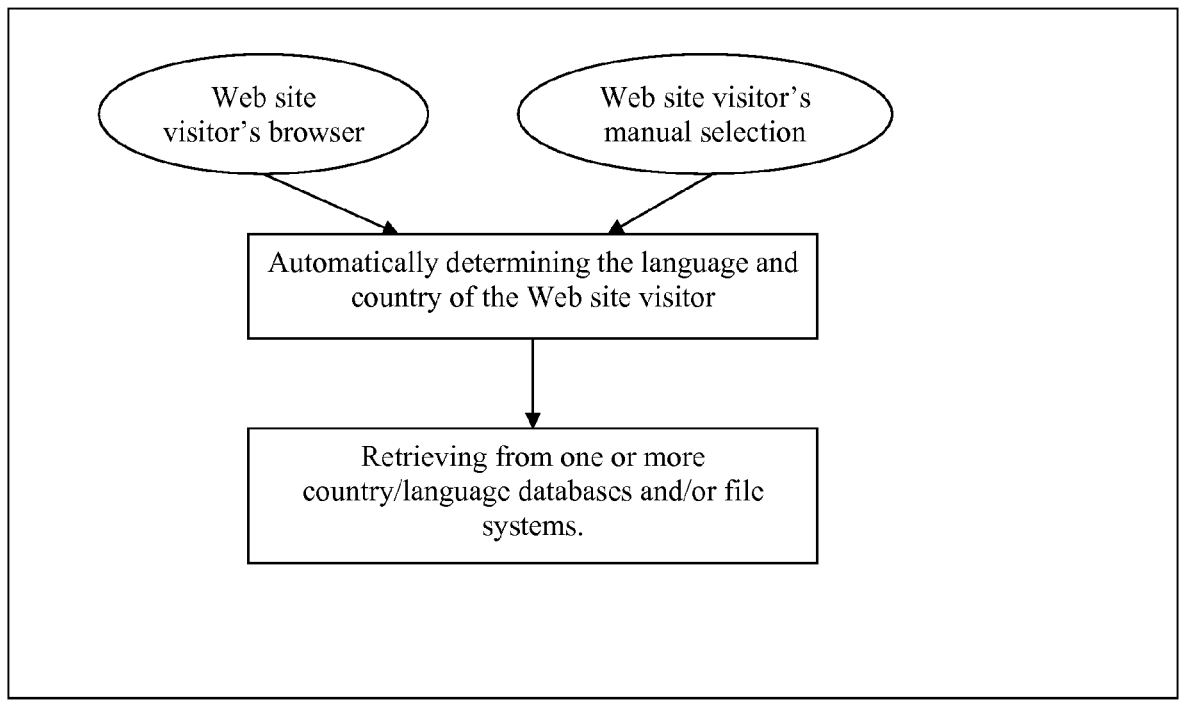
FIG. 2 shows prior art methods used by U.S. Pat. No. 6,623,529, David Lakritz, Sep. 23, 2003, in determining the language and country of a web site visitor, and using the determination in retrieving documents from country/language databases.
Figure 3:
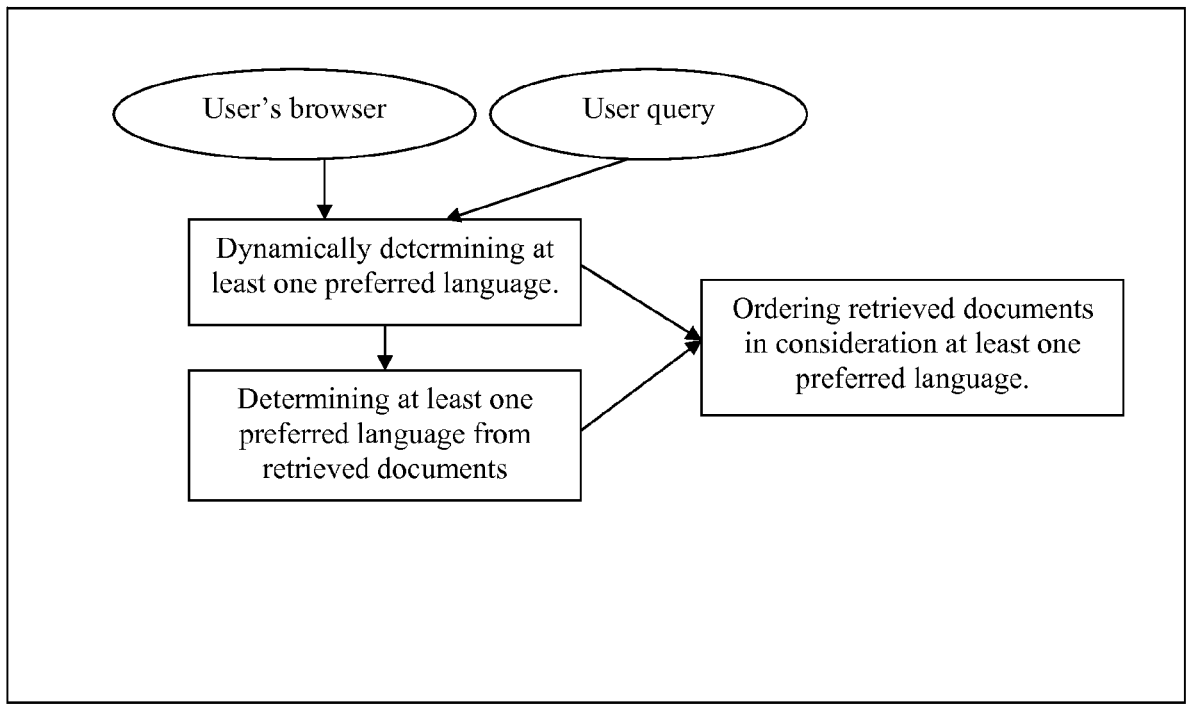
FIG. 3 shows prior art methods used by US2004/0194099 A1, Lamping et al., Sep. 30, 2004, in dynamically determining preferred languages from user queries as well as from preliminary search results, in order to sort final search results with one or more preferred languages.
Figure 4:
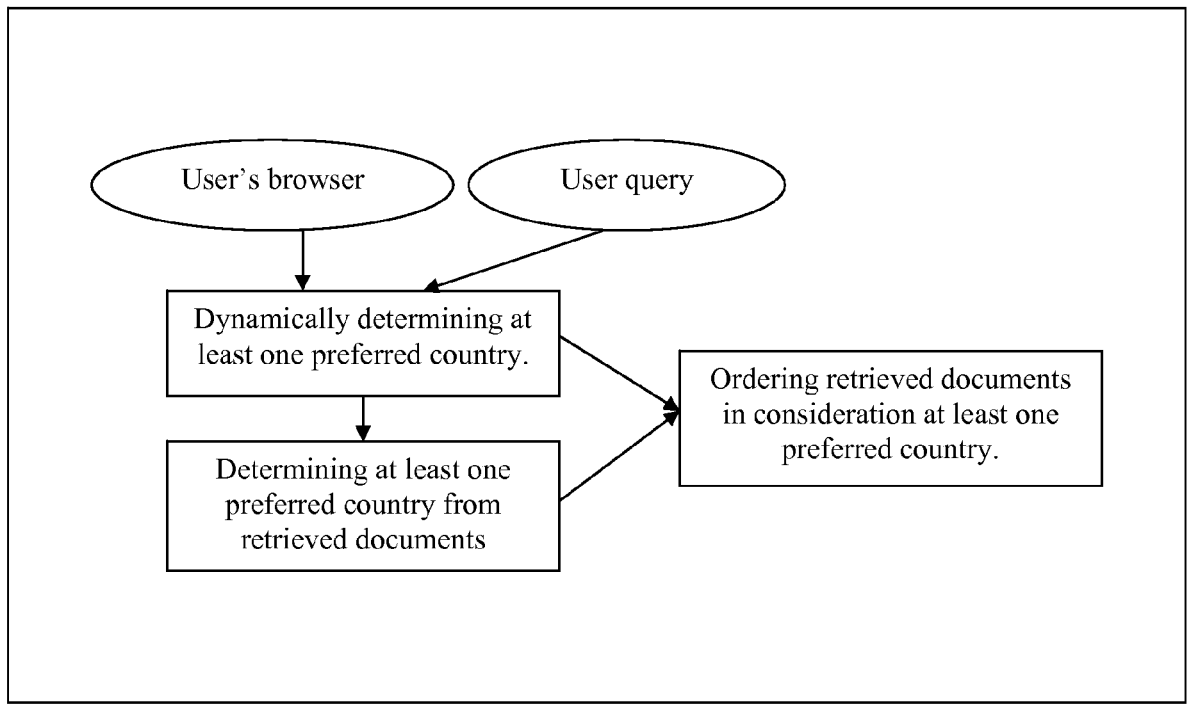
FIG. 4 shows prior art methods used by US 2004/0254932 A1, Gupta et al., Dec. 16, 2004, in dynamically determining preferred country from user queries as well as from preliminary search results, in order to sort final search results with one or more preferred country.
Figure 5:
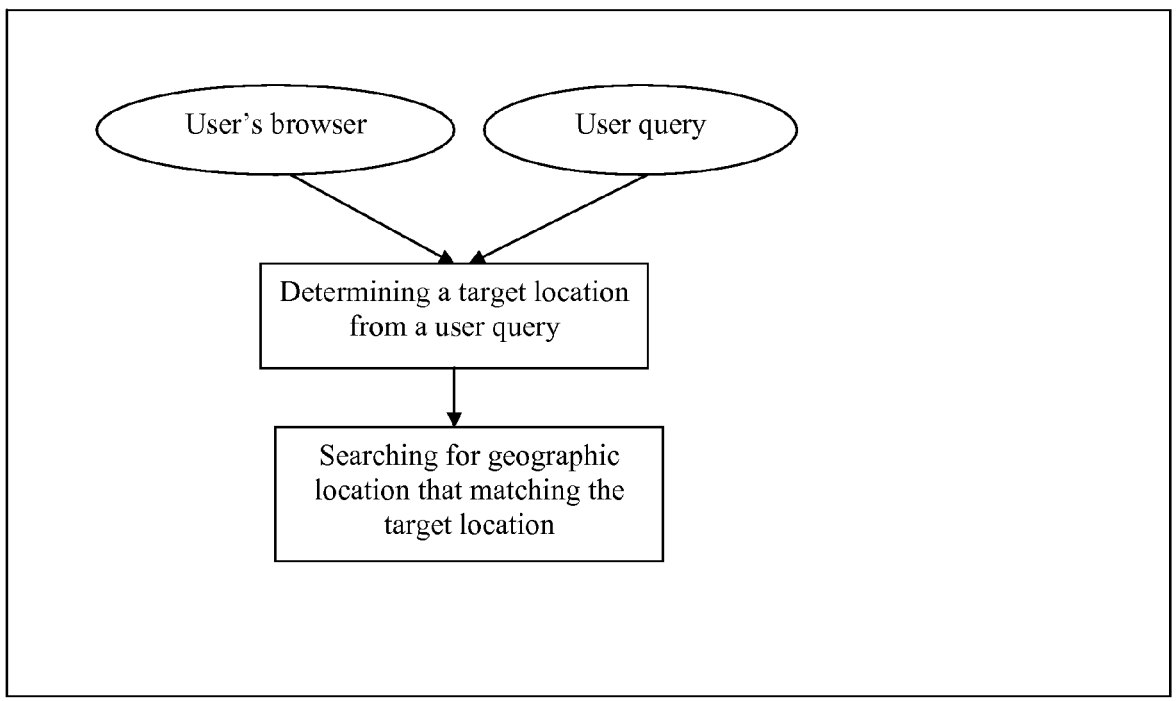
FIG. 5 shows prior art methods used by US2006/0106778 A1, Laura Baldwin, May 18, 2006, in determining a geographic location from a user query. (This prior art also disclosed their utilization of user's browser's information in the same determining step.)

FIG. 1 depicts a class of methods that automatically discern 500 a set of suspected geographical origins from which a user may have connected to a server through a user connection 405, identify one or more languages of a user query 410, use the languages to evaluate 545 applicability of each of the suspected origins, determine 520 at least one preferred language, and use the origins and languages in retrieving records and displaying them to the user.

Figure 6:
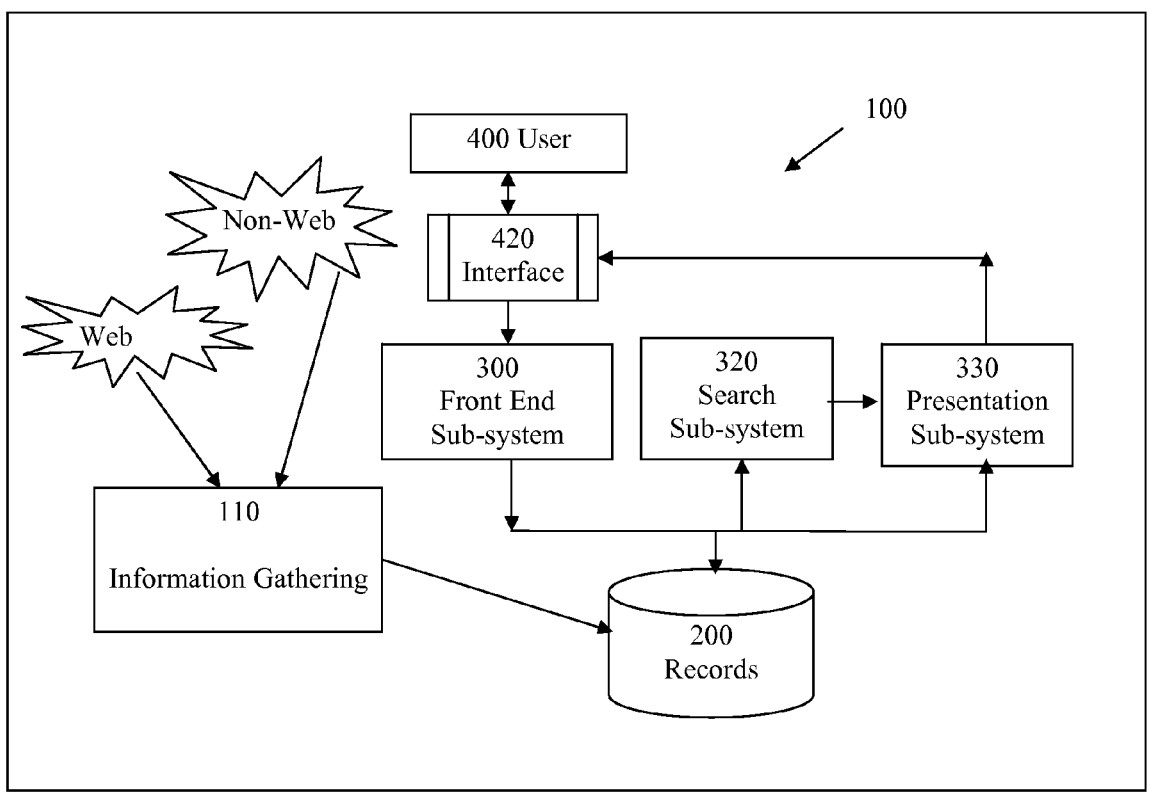
FIG. 6 depicts generally an embodiment of this invention, where a user connects to the system, submits a query, and the system retrieves and displays records.

FIGS. 2-5 are prior art described in the Background section. FIG. 6 depicts generally an embodiment 100, where a user 400 connects to the system through the Interface 420. Through 420, a user query is submitted to the Front End Sub-system 300, which provides the user query as well as other information, to the Search Sub-system 320, which finds matches among records stored on 200 Records Repository. The Presentation Sub-system 330 is provided with matching records as well as other information from 300 and 320, and display records on the Interface 420. Records on 200 have been processed from information gathered by 110 Information Gathering Sub-system from Web or non-Web sources before a user connects.

Regarding 200 Records Repository, a record is associated with a geographic location, including but not limited to a postal code, a district, a non-political region, a city, a county, a metropolitan or micropolitan statistical areas for example, as defined by the US Census), a country, and a continent. For example, a post code could be "90210" or "310013"; a political district "Central, Hong Kong"; a city "Los Angeles" or "Hong Kong"; a county "Los Angeles County"; a non-political region "West Los Angeles" or "the Greater Los Angeles" or "the West Coast" or "New England"; a metropolitan or micropolitan statistical area ""Norfolk-Virginia Beach-Newport News"; a country "United States of America"; a continent "North America".

A record is also associated with at least one language. A language could be "English", "American English", "British English", "Chinese", "Cantonese", "Chinese simplified", "Chinese traditional", or "Chinese Hong Kong". Further, a record comprises information in the form of text, or of rich media format (e.g. audio, video, image), or a combination.

Still further, a record could be a combination of other records. For example, a record labeled as "Record A" could be about a company's general introduction, and is combined from three records, "Record A1", "Record A2", "Record A3", and "Record A4", where "Record A1" is textual and associated with the geographical location "China mainland" and the language "Chinese simplified", "Record A2" is textual and associated with the geographical location "California" and the language "US English", "Record A3" is a video with Chinese dubbing and associated with "China mainland" and the language "Chinese simplified", and "Record A4" is a video with English dubbing and associated with "California" and "US English".

Still further, records on 200 Records Repository are partitioned. For example, one partition of the records could comprise web pages from a company, and another partition could comprise advertisements in textual or rich media format from a same company.

Through out the discussion below, it is intended that a method applied to one partition might not be the same for another partition.

Figure 7:
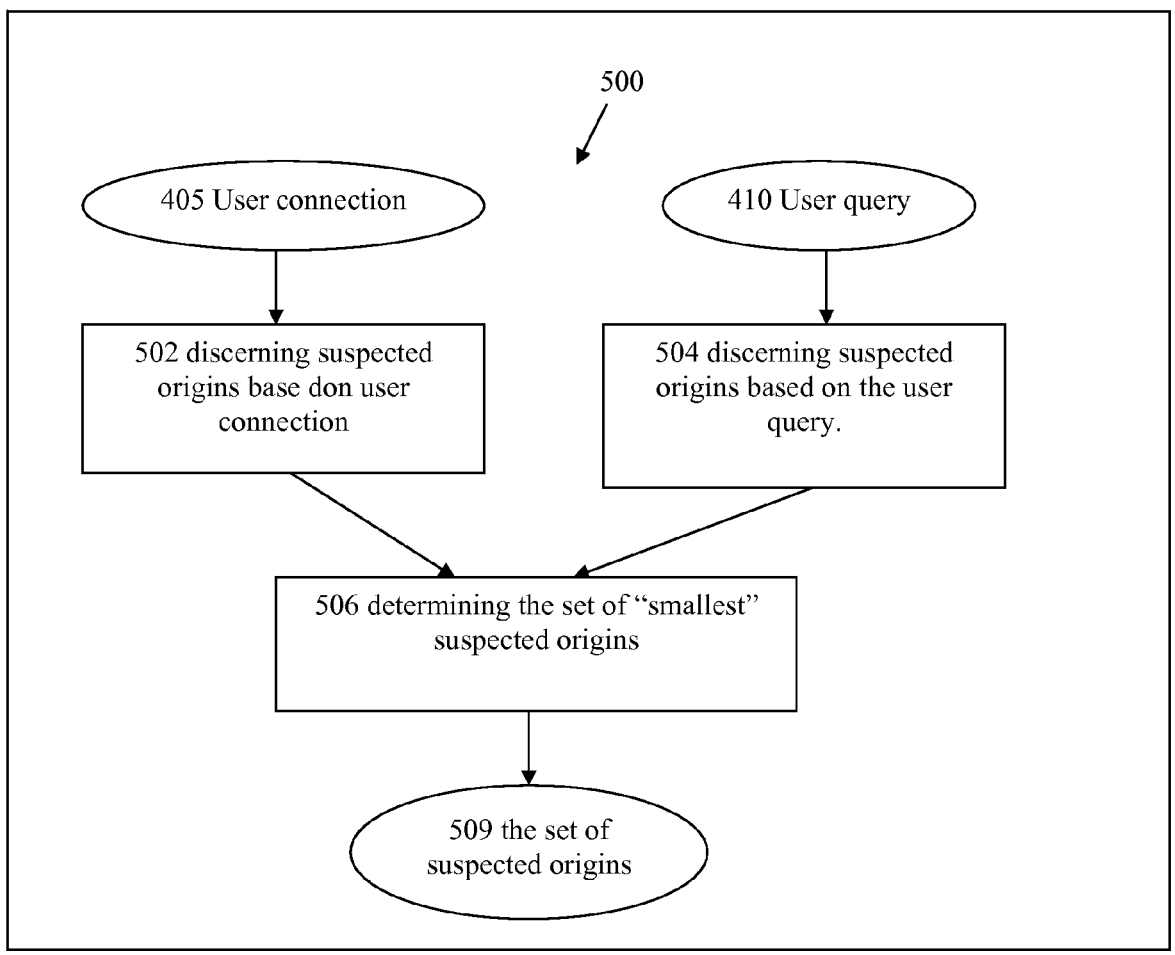
FIG. 7 depicts the general steps of automatically discerning a set of suspected geographic origins of a user, using both the user's connection (e.g., a Web browser) and the user query.

FIG. 7 depicts Step 500 of automatically discerning a set of suspected user origins 509, which generally comprises a user connection 405, a user query 410, step 502 discerning origins from the user connection, step 504 discerning origins from the user query, and step 506 deciding on a set of "smallest" suspected origins. A geographical origin is the geographical location from which the user connects to the server.

A user connection 405 preferably is from a computer (desktop, laptop, workstation, server, etc.), alternatively from a cell phone, or a PDA, or others. In prior art US 20040254932 A1, Gupta et al., Dec. 16, 2004, various such connections are disclosed in paragraph 0030.

In Step 502, different methods are applied to different connections, to name a few below.

- A) A client computer connecting using the HTTP protocol. Typically the client uses a web browser, which transmits various piece of information, as specified by the Common Gateway Interface protocol, including but not limited to (1) the client's Internet Protocol (IP) address which can be used via Reverse IP lookup in order to map to geographic locations. This is disclosed in both US2004/0194099 A1, Lamping et al., Sep. 30, 2004, paragraph 0081, and US2006/0106778 A1, Laura Baldwin, May 18, 2006, paragraph 0038; (2) the client's hostname, which can be mapped via Domain Name Resolution to geographic locations. This is also disclosed by the above two prior arts; and (3) with certain software such WebPlexer, country can be automatically determined, as disclosed in U.S. Pat. No. 6,623,529, David Lakritz, Sep. 23, 2003, section 3.4.1.
- B) A client providing a phone number. A cell phone client could provide this information. The phone number's country code, area code, central office code, as well as the other parts of the phone number, can all be used in mapping into geographic locations.
- C) A client providing GPS coordinates. GPS coordinates can be mapped into geographic locations.

In Step 504, the user query string is analyzed for information suggestive of geographical locations. Some of the methods are discussed below:

- (504A) Looking for a proper name for geographic locations such as "Los Angeles", "Shanghai", the Chinese equivalent of "Shanghai", a location's nickname such as the "Big Apple". This method is generally disclosed in US2006/0106778 A1, Laura Baldwin, May 18, 2006, paragraph 0040.
- (504.B) Looking for information other than proper names suggestive of geographic locations. For one example, in the query "flying from LAX to JFK", two geographic locations are present.

In Step 506, at least two sets of suspected origins are merged, and the goal is to find the set of "smallest" geographical locations, whose preferred definition is that the union of members covers the smallest possible geographical area. For example, given the following two sets: (i) {"United States"}, and (ii) {"California", "Oregon", "Arizona"}, the method finds the latter set. All suitable algorithms are contemplated, including but not limited to lookup tables, greedy search algorithms, and shortest path algorithms.

Figure 8:
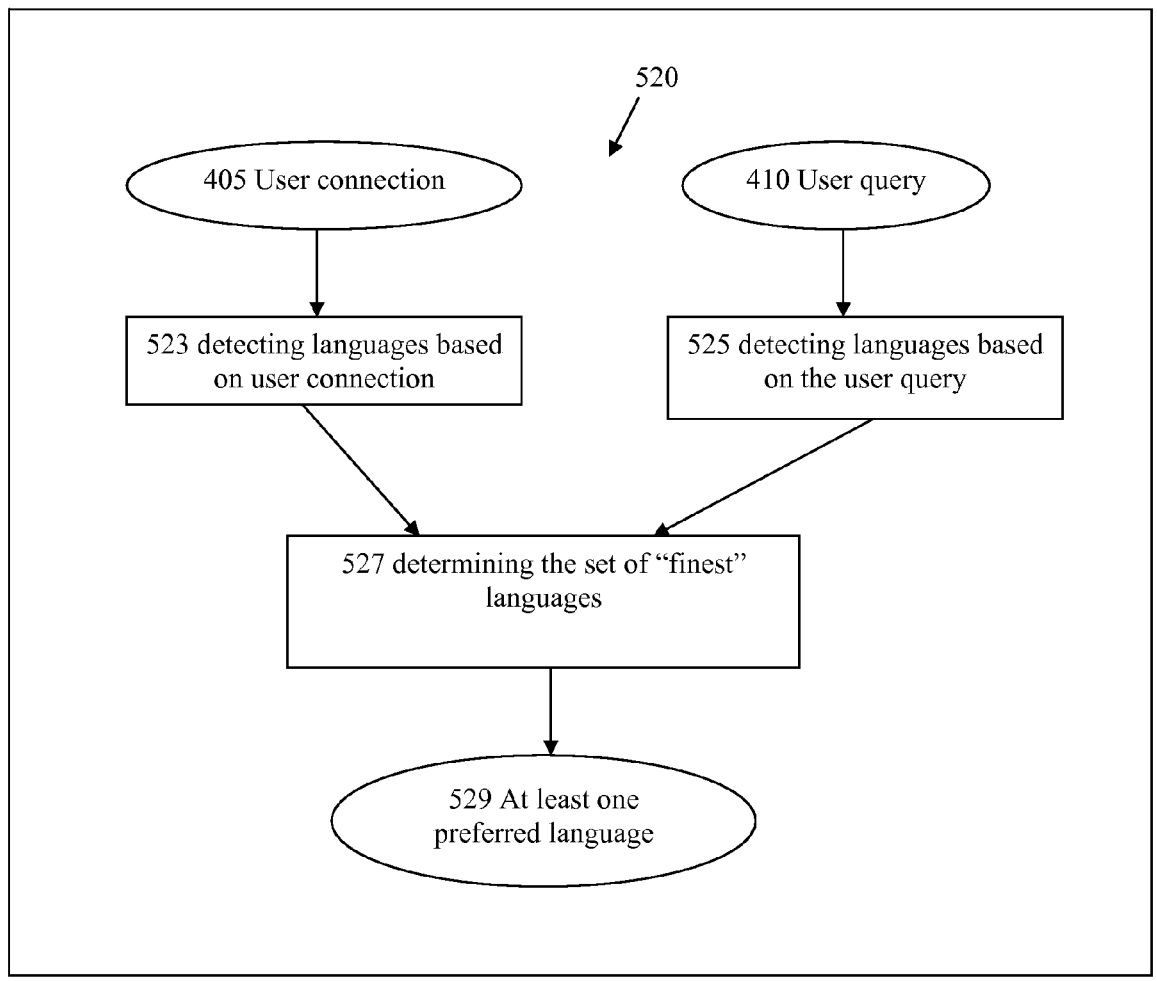
FIG. 8 depicts the general steps of determining languages of the user, also using both the user's connection and the user query.

FIG. 8 depicts Step 520 of detecting languages the user uses, which generally comprises a user connection 405, a user query 410, step 523 of detecting languages from the user connection, step 525 of detecting languages from the user query, and step 527 of merging the previous detections into a set of languages.

In Step 523, different methods are applied to different connections, to name a few below.

- (523.A) A client computer connecting using the HTTP protocol. A web browser transmits various piece of information, as specified by the Common Gateway Interface protocol, and additionally through request message header, including but not limited to (1) the language accepted by the client's web browser. This is disclosed in prior art U.S. Pat. No. 6,632,529, David Lakritz, Sep. 23, 203, section 3.3.4, as well as in US2004/0194099 A1, Lamping et al., Sep. 30, 2004, paragraph 0079 and 0080; and (2) the client's operating system (such as "Microsoft XP Chinese"). Such information can be mapped into geographic locations. For example, "Microsoft XP Chinese" could be mapped to languages of {"China simplified Mainland China", "Chinese simplified Singapore"}.
- (502.B) A client providing a phone number. A cell phone client could provide this information. The phone number's country code is readily mapped into at least one language. Sometimes the area code is readily mapped into at least one dialect (e.g., Cantonese in parts of China).

In Step 525 of detecting languages from the user query, some contemplated methods are listed below.

- (525.A) Technology for language identification for a text string is well known, e.g., the Rosette Language Identifier software from Basis Technology, Inc.
- (525.B) In the case of a user query string composed of at least two different languages, new method is developed by this invention, so that a query string is first segmented into different parts, and each part is further detected of its preferred languages.

In Step 527, at least two sets of languages are merged into one set. The goal is to find a set of "finest" languages. For example, given two sets, (i) {"English", "Chinese"}; (ii) {"American English", "Chinese"}, the former is found. All suitable algorithms are contemplated, including but not limited to lookup tables, greedy search algorithms, and shortest path algorithms. In step 529, the system derives at least one preferred language.

Figure 9:
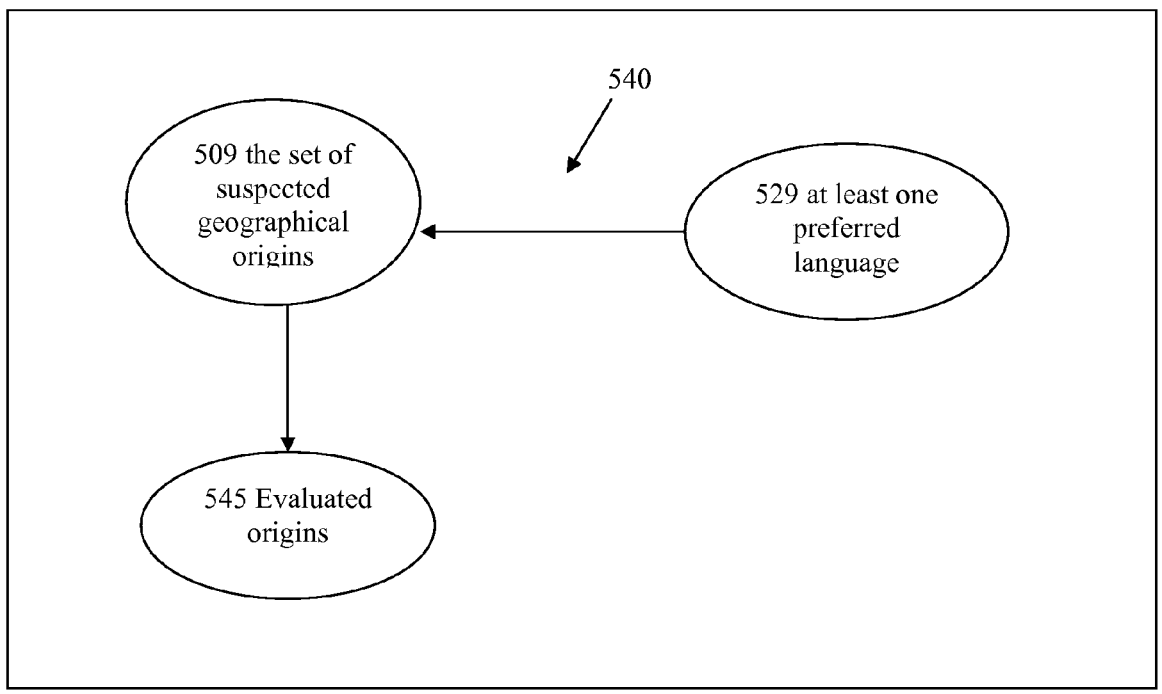
FIG. 9 depicts the general steps of using user languages in evaluating the goodness of individual members of the set of suspected origins.

FIG. 9 generally depicts a contemplated strategy 540 for using at least one preferred language 529 to modify the set of the suspected origins 509, and associating a confidence measure on every element in the set of origins. The result is the evaluated set of origins 545.

The system has knowledge on mapping from languages to geographical locations. One piece of knowledge could be ("Chinese simplified"=>{("China mainland", 0.9), ("Singapore", 0.4), ("China Hong Kong", 0.1)}. This piece knowledge states that the language "Chinese simplified" corresponds to three geographical locations each of which is associated with a confidence measure of 0.9, 0.4 or 0.1 respectively. Suppose there is a set of suspected geographical origins {"China mainland", "China Hong Kong", "Singapore", "Taiwan"}, and a user query's language is identified as {"Chinese simplified"}, then applying the above piece of knowledge to the set of origins could lead to the removal of the element "Taiwan", and the remaining three elements are associated with confidence measures partially derided from the piece of knowledge.

Figure 10:
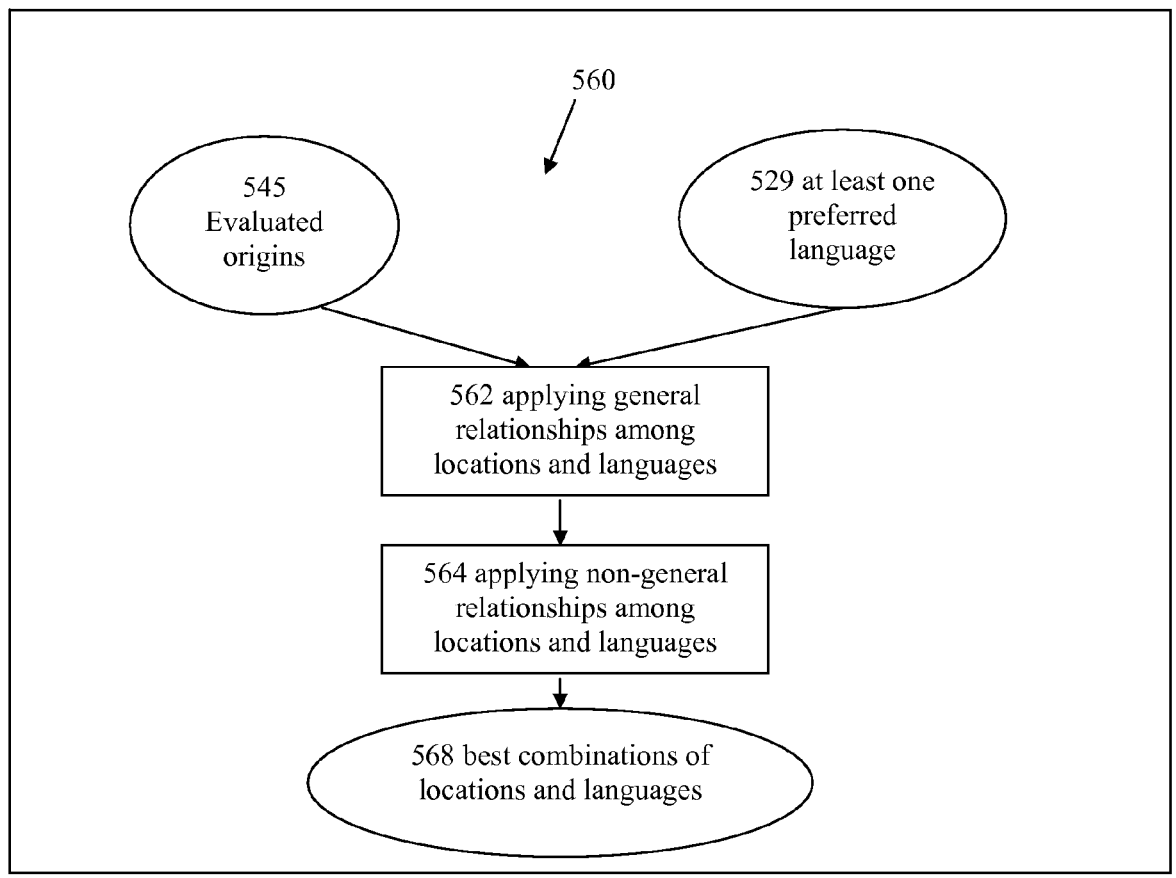
FIG. 10 depicts the general steps in evaluating combinations of languages and locations.

FIG. 10 depicts methods in finding the best combinations of locations and languages, which generally comprises the evaluated set of origins 545, the languages 529, Step 562 applying generally relationships among languages and locations, and Step 564 applying non-general relationships among languages and locations. The result is the best combinations 568.

In Step 562, general relationships among languages and locations are applies in order to evaluate combinations. Such relationships comprise commonly known language and location combinations that exist. For example, given the set of origins {"London"} and the languages {"US English", "UK English"}, then the combination of ("London", "UK English") is evaluated as a preferred one to ("London", "US English"). The system stores such relationships, with one embodiment in a lookup table.

In Step 564, non-general relationships among language and locations are applied. Some sets of such relationships are listed below.

(564.A) One set of such relationships are those of local nature. For example, regions such as Montreal have two prevailing languages, and this local relationship overrides the general relationship of ("Canada", "English").

(564.B) Another set of such relationships are those inheritably "conflicting". For example, a user connects from Shanghai, using a browser on a Microsoft XP Chinese operating system, submitting a query in simplified Chinese that has "90024" in it. The suspected origins are thus {"Shanghai", "90024"} (90024 is a zip code in Los Angeles), and the language {"Chinese simplified"}. Consider the relative goodness of the two combinations: ("90024", "Chinese simplified") and ("Shanghai", Chinese simplified). The first combination might well be what the user is seeking (information relevant to the zip code, and in simplified Chinese), however, there is very little such information exits. The second combination might not be what the user is seeking, but there is a large amount of such information exists. Such relationships are accumulated through interviewing experts and by collecting statistics, and stored on the system. One embodiment is the storage is lookup tables, another embodiment probability rules.

Once the suspected origins, the languages, and the best combinations of the two, are derived, they are used in retrieving and displaying records.

As stated above, a record on 200 Record Repository has been associated with a geographic location and a language. The matching of a user's geographical origin and a record's geographical location is done at smallest geographical area possible. For example, if a set of origins is {"California", "Arizona"}, and a location is {"Los Angeles"}, then the matching is "Los Angeles".

At Search Sub-system 320, the matching of a query's language and a record's language is at the finest possible. For example, if a query's language is "Chinese", and a record's language is "Chinese simplified", then the matching is "Chinese simplified". The Search Sub-system 320 retrieves those records whose geographical locations and languages match a user query with priority over those do not. Further, the best combinations 568 are applied in sorting the retrieved records. All suitable algorithms are contemplated, including but not limited to lookup tables, greedy search algorithms, and shortest path algorithms.

At Interface 420 where retrieved records are displayed, several methods are contemplated as below.

(420.A) If there are two combinations of location and language, display records in two areas, one for the first combination, and the other for the second combination. If there are more than two good combinations, records in the best two are displayed first.

(420.B) If combinations of locations and languages are not available, the following methods are contemplated:

(420.B.1) If a user query has two suspected origins, our system displays records in two areas, one for the first origin, and two for the second origin. If there are more than two origins, records in the two with highest confidence measures are displayed first. Preferably records are displayed in two areas.

(420.B.2) If a user query has two suspected languages, our system displays records in two areas, one for the first language, and two for the second language. If there are more than two languages, records in the two with finest languages are displayed first. Preferably records are displayed in two areas.

Thus, specific embodiments and applications of searching with awareness of locations and languages and related improvements have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of providing records to a user, comprising:
   identifying a set of different languages of terms submitted in a query by the user;
   using the set of languages to automatically discern a set of suspected geographical origins from which the user may have corrected to a server;
   finding a best combination of a language and a suspected geographical origin from the sets of languages and origins; and
   using the best combination to guide retrieval of search results responsive to the query and to rank the search results.

2. The method of claim 1, wherein at least one of the set of suspected geographical origins is a non-political region.

3. The method of claim 1, wherein at least one of the set of suspected geographical origins is a metropolitan or micropolitan statistical area.

4. The method of claim 1, wherein at least one of the set of suspected geographical origins is a postal code.

5. The method of claim 1, wherein at least one of the set of suspected geographical origins is an airport code.

6. The method of claim 1, wherein the set of suspected geographical origins includes a geographically smallest member, and one of the members is the geographically smallest member.

7. The method of claim 1, further comprising using a second term from the query to assist in evaluating the applicability of members.

8. The method of claim 1, further comprising concurrently displaying to the user search results with respect to multiple countries/regions.

9. The method of claim 1, further comprising concurrently displaying to the user search results in at least two languages from the set of languages.

10. The method of claim 1, wherein at least some of the search results contain data in a rich content format.

11. The method of claim 1, further comprising providing a display to the user that includes first and second areas, each of which contains a portion of the search results.

* * * * *